United States Patent [19]
Colonius et al.

[11] Patent Number: 5,078,254
[45] Date of Patent: Jan. 7, 1992

[54] NONSYNCHRONOUS POLYGON MANUFACTURING SYSTEM

[75] Inventors: Ray E. Colonius, Bloomfield Hills; Edward J. Early, Romeo, both of Mich.

[73] Assignee: Cargill Detroit Corporation, Clawson, Mich.

[21] Appl. No.: 158,563

[22] Filed: Feb. 22, 1988

[51] Int. Cl.$^5$ .............................................. B65G 47/00
[52] U.S. Cl. .............................. 198/345.3; 198/465.2; 198/465.3; 29/33 P
[58] Field of Search .................. 198/345, 465.2, 465.3, 198/803.2, 345.3; 29/33 P, 563; 414/222

[56] References Cited

U.S. PATENT DOCUMENTS 3,724,052  4/1973  Graham et al. .................. 198/465.3
3,738,478  6/1973  Tourtellotte ..................... 198/465.3

FOREIGN PATENT DOCUMENTS 2518689  11/1976  Fed. Rep. of Germany ... 198/465.2

Primary Examiner—Joseph E. Valenza
Attorney, Agent, or Firm—Lloyd M. Forster

[57] ABSTRACT

A closed horizontal path nonsynchronous manufacturing system employing dual conveyor chains supporting and transporting fixturized workpiece pallets in single file to a plurality of sequential work stations located at straight segments of the path connected by polygonal obtuse angle corners. Accurate registration and clamping means engaging a straight pallet side with single register pin actuation utilizes straight conveyor segments for inside and/or outside operating stations with minimum lost space for polygonal obtuse angle corner transition.

20 Claims, 10 Drawing Sheets

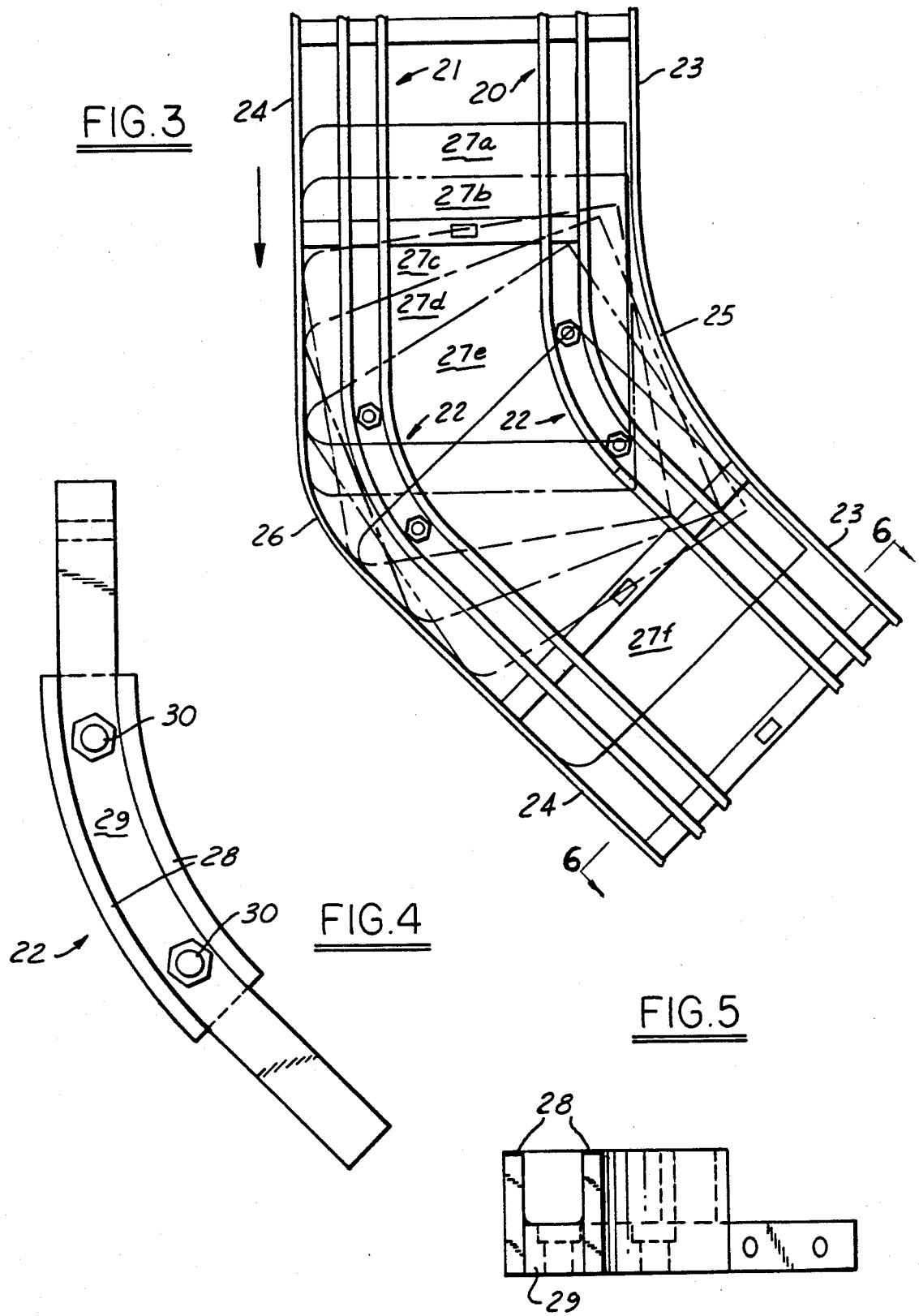

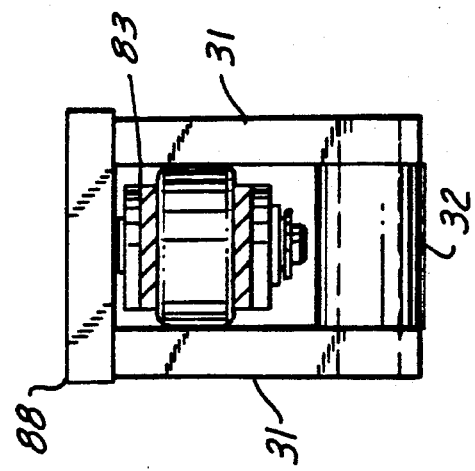
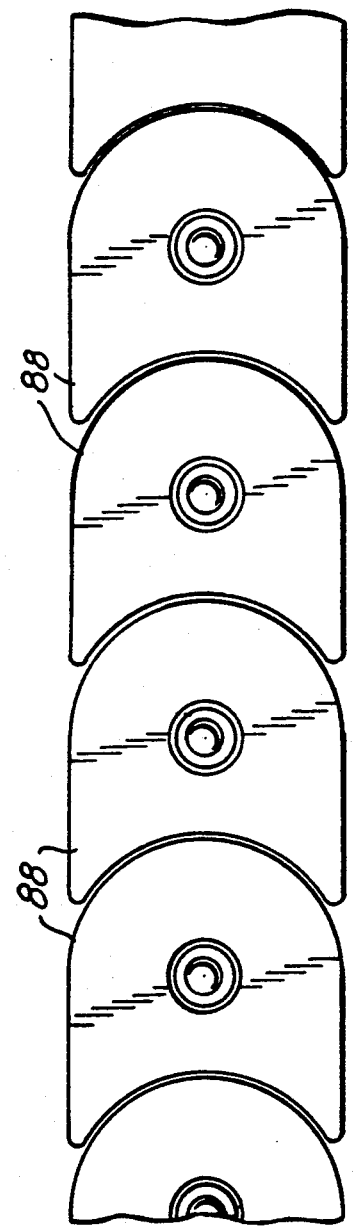
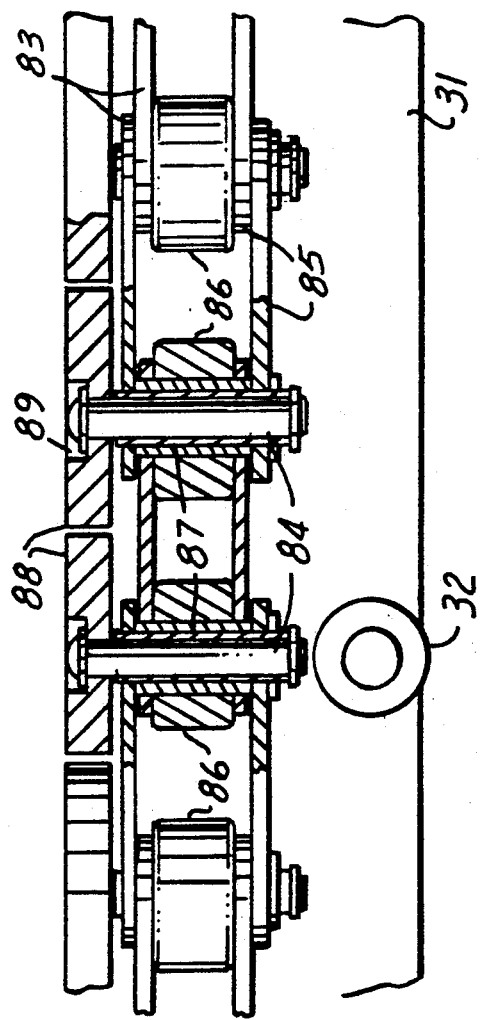

NONSYNCHRONOUS POLYGON MANUFACTURING SYSTEM

BACKGROUND OF THE INVENTION

A nonsynchronous manufacturing system, employing standard fixturized work piece holding pallets which can be conveyed along a line, stopped, accurately located, rigidly clamped for a work operation, and released to proceed to a plurality of successive work stations for performing a plurality of sequential operations, is disclosed in U.S. Pat. No. RE.25,886 issued Oct. 26, 1965. The illustrated embodiment employs a vertical loop conveyor having a continuous chain drive with means for clutching and declutching the pallets at the operating stations on an upper level and with pallet return on a lower level.

The basic nonsynchronous system, with each work station operating independently of the others and with variable float of pallets between stations, has also been implemented in horizontal systems where a continuous chain conveyor drive is adapted to support and frictionally drive pallets which can be stopped and accurately located at successive stations. The configuration of such horizontal systems has generally been in the form of parallel lines joined by semi-circular ends with work stations confined to the straight line portions of the sytem.

A further modification of the basic nonsynchronous system is disclosed in U.S. Pat. No. 4,570,782 wherein a circular path conveyor is provided by means of a continuously rotating horizontal plate or ring. Here again the pallets proceed independently from station to station where they are stopped, located and clamped for the duration of the work operation and released for frictional drive to the next station independently of the other pallets which may cue up behind any pallet during its operation at the work station.

In horizontal chain drive installations, two types of chain conveyor have been employed each involving a roller chain and sprocket drive. In one, a single chain having vertical axis pivots is provided with relatively wide upper flat surface crescent plates each connected to a recessed pin of the roller chain to provide a smooth surface for frictional drive with the under surface of work piece loaded pallets. The upper surfaces of such crescent plates lie in the same plane with circular arc male and female crescent ends to accommodate horizontal articulation passing around curved paths. Laterally spaced dual chains of similar construction have also been employed with smaller crescent plates and links, both narrower and having shorter pitch, which have become standard for most applications and are preferred for use in the systems of the present application.

BRIEF DESCRIPTION OF THE PRESENT INVENTION

Standard pallet locating apparatus provided by station registers generally employed in all of the nonsynchronous manufacturing systems referred to herein, other than the circular system of the '782 patent, advantageously employ straight track sections at each operating station to facilitate accurate pallet location along one straight side edge of the pallet and rigid clamping. Thus, in the systems employing semi-circular ends joining parallel straight sections, considerable space is devoted to arcuate transport without effective operating stations. The present system greatly reduces such lost length of track by employing obtuse corner angle straight sided polygonal cells or polygonal ended configurations with minimal transistion arcuate corners, if any. The phrase "minimal transition" is intended to define a sharp obtuse angle corner having rounded vertices to avoid pallet corner impact. Each straight segment may accommodate one or a plurality of operating stations and total configurations of hexagonal, octagonal, or elongated varitions with parallel straight sectins and semi-polygon ends may be designed to accommodate virtually an unlimited number of stations with efficient utilization of substantilly the entire length of track.

Minimal corner radii or circular arc segments connecting obtuse angle straight sections are provided by utilizing the short pitch length of dual chains as the limiting factor in determining a single minimum corner radius used for both outer and inner dual chain tracks with coordinated pallet guide tracks developed to assure a smooth transition around each corner without binding, even for relatively short pallets of generally rectangular configuration which may be employed to maximize "float" as to number of pallets which may be accommodated between stations for any given size of workpiece.

Equal linear chain speed drives employed in the dual horizontal chain system inherently result in the outer chain losing position relative to the inner chain at each corner transition tending to rotate the pallet, frictionally engaging both chains, within the limits of the inner and outer pallet guide tracks. Such tendency for the chains to rotate the outer side of the pallet backwards must not only be resisted by the pallet guide tracks but overcome to produce a forward rotation of the outer pallet side, e.g., 45° in the case of octagonal configuration, as required in passing around a corner.

In developing the curvature and spacing for the respective chain and pallet guide tracks, a number of considerations define the parameters:

(1) The minimum radius for the chain track with lateral chain roller engagement is established by required clearance for the link chord extending between adjacent rollers consistent with anti-friction roller contact. A casting or forging provided with such minimum arc, having adequate strength to withstand chain tension applied to the chain rollers, is utilized not only for the inner chain but also for the outer to thereby conserve tooling costs.

(2) With parallel chains leading to and away from each corner, the innermost arcuate corner of each chain track is provided in tangent relation with both adjoining straight sections, which are spaced relative to the pallet width to provide properly balanced support as well as an open center to accommodate intermediate station apparatus for raising the pallets in locating or rotating to different index positions.

(3) With whatever lateral chain spacing is employed, the same rotational effect is encountered at each corner which must be resisted by the respective inner and outer pallet tracks and overcome to produce the required counterrotation through the obtuse angle between adjacent straight track sections. Development of the required inner and outer pallet guide track sections can be accomplished by first establishing the arc, if any, at the juncture of adjacent straight sections of the outer guide tracks, and next determining the area swept by a pallet having its outer ends in contact with the outer track throughout corner passage. The resulting curve at the inner margin of the swept area plus appropriate clearance establishes an acceptable curvature for the inner pallet guide track while maintaining desired balance and support on the respective chains.

(4) The lead outer corner of the pallet will continuously engage the outer guide track throughout the transition while the inner guide track not only limits the rotational displacement imposed by the outer chain lagging but, as indicated above, must impose counter-rotational displacement of the pallet without any possibility of pallet binding during the transition. The geometry of the respective contact points of the pallet with the inner and outer guide tracks will inherently change during the transition and must always satisfy the requirement of nonbinding angle of contact throughout the transition.

(5) Minimum corner transition can be accomplished by continuing straight outer pallet guide track sections to an obtuse angle intersection without any corner radius and by plotting the pallet transition with both leading and trailing outer ends of the pallet engaging the respective intersecting straight sections with the curve established by the area swept by the inner side of the pallet defining the curvature of the inner pallet guide track. With this approach, transition is accomplished within the length of the outer side of the pallet and may be somewhat shortened by rounding the outer side corners of the pallet, in which case, the inner side may optionally be left with corners unrounded to provide maximum length for pallet registration at the station as hereinafter described.

(6) In order to avoid corner impact of the pallet incident to an outer corner guide track intersection without radius, provision of a small corner arc is preferred to smooth the transition without unduly lengthening the duration of the transition.

(7) Relative frictional parameters also provide limitations on the minimum ratio of pallet length to width. Frictional resistance of side guide contact with diagonal corner side contact points of the pallet must be less than the propelling frictional force of the chain drive under relative prevailing coefficients of friction. In this respect, the diagonal angle of pallet contact points with the respective outer and inner guide rails increases to a maximum as the pallet reaches the midpoint of transition and a turning moment on the pallet at such time, due to differential chain speed, will increase the contact pressure at the pallet guide rails due to a toggling component which will tend to cause binding as a critical angle of friction is approached. Even if a binding angle is not reached, the resultant forward forces of chain drive must be sufficient to advance the outer side of the pallet at a relatively faster speed than the inner side in order to complete the transition. One factor favoring completion of the transition results from the fact that, notwithstanding the initial turning moment on the pallet resulting from differential lagging of the outer chain, once the pallet slows sufficiently to cause sliding at both inner and outer chains, any turning moment is neutralized, since equal forward propelling forces will be produced by both chains, notwithstanding a differential in relative rate of sliding at the chain contact with the pallet surface.

(8) If the critical angle at the midpoint of transition reaches or approaches a binding angle, a reduction in such angle can be provided by locating the inner track with increased separation from the outer track causing the inner contact point of the pallet to move back relative to the outer lead contact point.

Through the development and implementation of such parameters, minimum corner radii with smooth pallet transition have been provided to correspondingly maximize available straight station locating sections for any required number of stations.

BRIEF DESCRIPTION OF THE DRAWINGS

FIG. 3 is a typical octagonal corner illustrating progressive pallet positions in rounding the corner;

FIG. 4 is a plan view of a typical corner chain track casting;

FIG. 5 is an end view of the casting illustrated in FIG. 4;

FIG. 14 is an end elevation of one of the dual roller chains employed for transporting pallets throughout the system;

FIG. 15 is a partially sectioned side elevation of the chain shown in FIG. 14;

FIG. 16 is a plan view of the chain shown in FIG. 15 and 15;

DETAILED DESCRIPTION OF PREFERRED EMBODIMENTS

Figure 1:
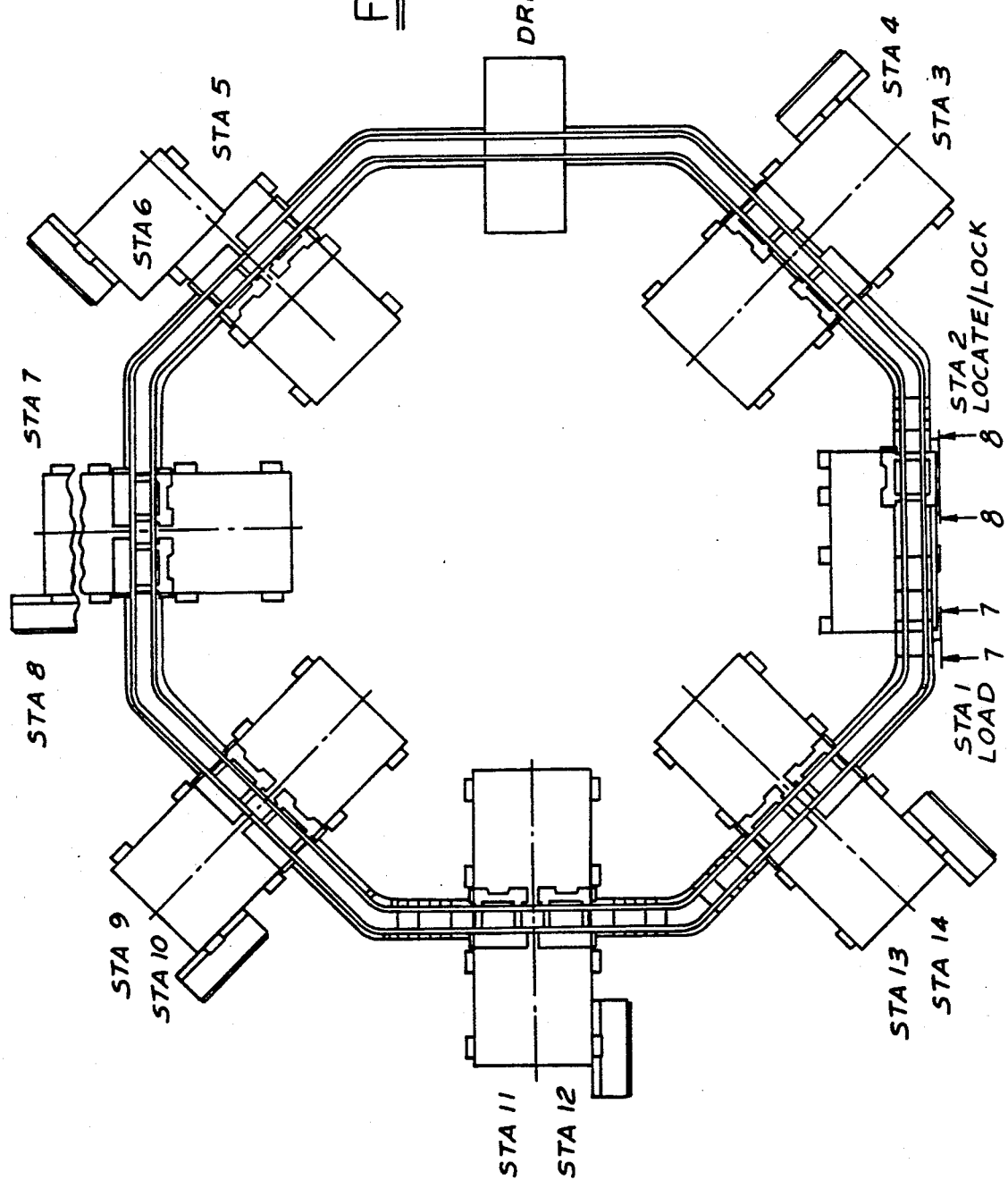
FIG. 1 is a plan schematic layout view of a typical octagonal system.

With reference to FIG. 1, a typical octagonal Continuous Flow Manufacturing Cell (CFM Cell) is shown schematically illustrating a first embodiment of the system, in this case providing fourteen stations, with inside and outside operations, developed for machining steering column lock cylinders for automotive vehicles. By employing an appropriate "state of the art" programmable controller, a SEQUENCE OF OPERATIONS for "A" and "B" loads of the following character has been provided:

| STATION NO. | OUTSIDE | INSIDE |
|---|---|---|
| 1 | "A" Load: Unload & Load (1) Part "B" Load: Unload & ReLoad (1) Part | "A" Load: <br> "B" Load |

-continued

| STATION NO. | OUTSIDE | INSIDE |
|---|---|---|
| 2 | "A" Load: | "A" Load: Auto Clamp |
|   | "B" Load: | "B" Load: Auto Clamp |
| 3 | "A" Load: | "A" Load: |
|   | Bore Hole #1A | Bore Hole #1B |
|   | "B" Load: | "B" Load: |
|   | Step Drill Hole #15 | -Step Drill Hole #14 |
|   |   | -Combination Drill & Chamfer Holes #10 & 11 |
|   |   | Drill Holes #13A & 13B |
| 4 | "A" Load: | "A" Load: |
|   | Combination Drill & Chamfer Holes #2 and 3 |   |
|   | "B" Load: | "B" Load: |
|   | Spotface Hole #15 | -Ream Holes #13A & 13B |
|   |   | -Combination Drill Ream Hole #18 (Comp. Angle) |
| 5 | "A" Load: | "A" Load: |
|   |   | Combination Drill & C'Bore Holes 8 & 9, & Drill Hole #9 |
|   | "B" Load: | "B" Load: |
|   | Combination Bore & Hollow Mill Hub Hole #17 | Drill Hole #17 |
| 6 | "A" Load: | "A" Load: |
|   |   | Combination Drill & Chamfer Holes #5, 6, 20 & 21 |
|   | "B" Load: | "B" Load: |
|   | Combination Form Groove & Face Top of Bore | -Spotface Hole #14 |
|   |   | -Deburr Holes #13A & 13B |
| 7 | "A" Load: | "A" Load: |
|   |   | Combination Drill & Chamfer Hole #4 |
|   | "B" Load: | "B" Load: |
|   |   | Drill Hole #12 |
|   |   | -Ream Hole #14 |
| 8 | "A" Load: | A' Load: |
|   | Deburr Holes #2 & 3 |   |
|   | "B" Load: | "B" Load: |
|   | Ream Hole #15 | -Ream Hole #12 |
|   |   | -Deburr Hole #18 |
| 9 | "A" Load: | "A" Load: |
|   | Deburr Holes #8 & 9 |   |
|   | "B" Load: | "B" Load: |
|   | Deburr Hole #17 | Deburr Hole #12 |
| 10 | "A" Load: | "A" Load: |
|   | "B" Load: | "B" Load: |
|   | Auto Press Bearing Hole #15 & Auto Press Pin Hole #12 | Auto Press Bearing Hole #14 |
| 11 | "A" Load: | "A" Load: |
|   | Burnish Hole #1A | Burnish Hole #1B |
|   | "B" Load: | "B" Load: |
|   | Burnish Bearing I.D. Hole #15 | Burnish Bearing I.D. Hole #14 |
| 12 | "A" Load: | "A" Load: |
|   | Broach Slot Hole #7 | Tap Hole #19 |
|   | "B" Load: | "B" Load: |
| 13 | "A" Load: | "A" Load: |
|   | "B" Load: | "B" Load: |
|   | Resistance Weld Pin Hole #12 |   |
| 14 | "A" Load: | "A" Load: |
|   |   | Auto Unclamp |
|   | "B" Load: | "B" Load: |
|   | Optional: Auto Unload (1) Part Onto Customer's Automation | Auto Unclamp |

In the foregoing SEQUENCE, reference Hole numbers with prefix # refer to holes in part prints, not shown, and not reference numbers on the drawings of this application.

Figure 2:
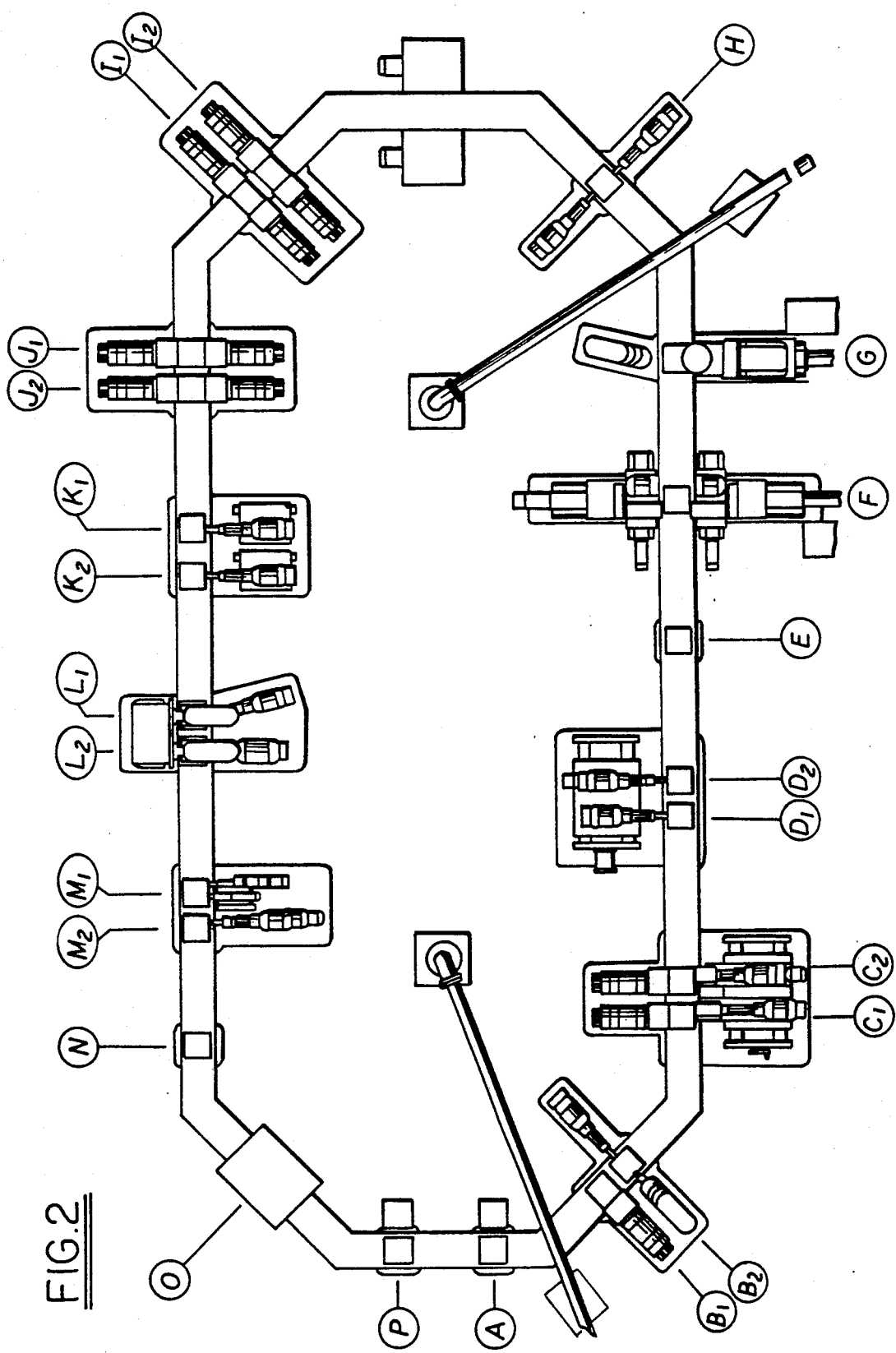
FIG. 2 is a typical elongated system layout having semi-octagonal ends.

With reference to FIG. 2, a schematic diagram illustrates an elongated system with semi-octagonal ends wherein inside and outside stations equipped with "state of the art" rotary machining units under programmable controller operation for spindle, U-axis and Z-axis servomotors, are adapted to machine left-hand and right-hand engine cylinders with the following sequence of operations:

| STATION NO. | LEFT-HAND (INSIDE) | RIGHT-HAND (OUTSIDE) |
|---|---|---|
| A | Automatically Clamp (1) Part | Manually Unload/Load (1) |

-continued

| STATION NO. | LEFT-HAND (INSIDE) | RIGHT-HAND (OUTSIDE) |
|---|---|---|
| B1 | Idle | Part Drill & Counterbore #33 thru #36 |
| B2 | Drill #11 | Drill #32 |
| C1 | Tap Drill #5 thru #10 and #101 thru #104 | Tap Drill #37 and #38 or #105 and #106 |
| C2 | Tap #5 thru #10 and #101 thru #104 | Tap #37 and #38 or #105 and #106 |
| D1 | Tap Drill #19 and #20 | Idle |
| D2 | Tap #19 and #20 | Idle |
| E | Rotate Pallet 90° Clockwise | |
| F | Mill Manifold and Spring Box Face | Mill Starter Bosses and Oil Minder Boss |
| G | Drill #46 | Mill Fins |
| H | Tap Drill #156 | Tap Drill #155 |
| I1 | Drill #161 and #162 and Tap Drill #39, #40, #44, and #45 | Drill #151 and Tap Drill #14 and #15 |
| I2 | Tap #39, #40, #44, #45 and #136 | Tap #14, #15, and #155 |
| J1 | Tap Drill #41, #42, and #43 | Tap Drill #12, #13, #152, and #153 |
| J2 | Tap #41, #42, and #43 | Tap #12, #13, #152, and #153 |
| K1 | Drill #163 or #166 | Idle |
| K2 | Ream #163 or #166 | Idle |
| L1 | End Mill #47 | Tap Drill #23 thru #31 |
| L2 | Tap #48 | Tap #23 thru #31 |
| M1 | Drill #157 & Tap Drill #164 | Idle |
| M2 | Tap #164 | Idle |
| N | Rotate Pallet 90° Counterclockwise | |
| O | Flush and Blowoff Part and Fixture | |
| P | Automatically Unclamp (1) Part | Idle |

In the above listing of operations, reference numbers with prefix # refer to part prints, not shown, and not to reference numbers on the drawings of this application.

In each of these systems dual drive chains are employed, as illustrated in FIG. 1, wherein a conventional drive system, with counter-rotating outside sprockets not shown, is provided at a drive station to continuously drive the conveyor chains at equal linear speeds during system operation.

While the stations illustrated in FIGS. 1 and 2 involve dedicated automatic operations governed by programmable controllers, the system can also be employed with stations of the flexible machining center type subdivided into a sequence of standard operations, e.g., milling, drilling, reaming, boring, turning, threading, and/or pressing, under NC, CNC, servo functions or other programmable control, including any desired tool change feature, which when combined with an indexable pallet, can provide computer integrated manufacturing the facility for volume production of a family of parts with minimal special tooling.

Space conservation for any such manufacturing system is provided by minimizing obtuse corner angle transition space and maximizing straight sections available for outside and inside station equipment. The parameters can be understood from analysis of a typical obtuse corner angle section as illustrated in FIG. 3 where inner chain track 20 and outer chain track 21 each leads to an identical transition arc section 22, preferably a casting or forging as illustrated in FIGS. 4 and 5. Straight obtuse angle sections of inner pallet guide track 23 and outer pallet guide track 24 are in turn respectively connected by arcuate inner section 25 and outer section 26 specially developed with reference to a standard pallet 27 having a generally rectangular configuration, square as shown in multiple sequence progression 27a-27f around the corner. The basic function of the specially developed pallet guide sections 25 and 26 is to lead the pallet through the obtuse angle transition arc, 45° counterclockwise in the case of the octagonal corner illustrated, with substantially uniform rate of rotation under the frictional propelling drive of the dual upper chain crescent plate surfaces traveling along tracks 20 and 21 at equal linear speed. This results in an opposite clockwise frictional rotational torque on the pallet due to the longer path of the outer chain causing it to lag in completing the arcuate transition. Thus, arcuate sections 25 and 26 of the pallet guide tracks must not only resist counterclockwise rotational force, but also impart an opposite clockwise rotation of the pallet through the 45° transition required in rounding the corner under the resultant predominant forward driving forces of the respective chains.

Throughout the transition, it is critical that the line joining the outer and inner contact points of the pallet with the respective outer and inner guide tracks be less than a locking or binding angle which could cause the pallet to "hang up" instead of proceeding smoothly around the corner.

The relative length of the pallet for a given guide track width is critical in avoiding a binding angle; also the clearance of pallet guide tracks relative to a passing pallet should be carefully developed in order to accommodate a minimum ratio of pallet length to width, since optimum clearance will provide a corresponding optimum minimum transverse angle between the relative contact points of the pallet's outer lead corner and inner side. Outer pallet guide track obtuse angle corners without any transition arc may be combined with an inner track providing optimum clearance relative to the area swept by a pallet having outer corners engaging the outer guide track in passing around the corner, thereby minimizing the corner transition space; at the expense, however, of a lead corner impact and sudden change of direction in place of a more gradual smooth transition. Rounded outer corners of the pallet as shown have been found desirable in assuring smooth transition and, in fact, operate to shorten the length of transition by shortening the chord length of the outer side relative to the outer guide track corner.

With minimum clearance between inner and outer pallet guide tracks, the critical angle between outer and inner contact points of the pallet will be reached at the half-way point in rounding the corner at which time the inner contact point reaches or approaches the center of the pallet. At this stage, the relative frictional forces between the pallet and guide rails and drive chains are complex; any lateral pressure at the respective guide rails incident to effective differential chain speed at the corner and resistance to pallet change direction will be amplified by the toggling effect of the transverse angle between contact points of the pallet with the inner and outer guide rails. The resulting resistance to forward movement of the pallet must be overcome by the effective chain traction where the opposing dual effects of the outer chain lag will tend to increase the lateral pressure while corner change in direction of both chains will tend to relieve such lateral pressure.

Thus, while the "angle of friction" of the respective pallet and rail materials provides one parameter limiting the minimum ratio of pallet length to width, the counteracting frictional chain drive forces may require empirical testing to confirm approaches to minimum length pallets. Increasing the clearance of the inner track at the midpoint of pallet transition may be resorted to, if necessary, to move the inner contact point backwards relative to the outer lead contact point and thereby reduce the transverse angle between respective outer and inner contact points further away from any potential binding angle. However, in the case of square pallets, the 30° minimum toggling angle, somewhat reduced by rounded outer corners as shown in FIG. 3, has proved completely satisfactory in providing a smooth transition without any pallet hang-up at the obtuse angle corners of either octagonal or hexagonal configurations.

While the ratio of pallet length to width of less than 1:1 is possible to maximize pallet "float" between stations, it is frequently desirable to employ square pallets in order to accommodate 90° indexing to present different faces of the workpiece for respective machining operations as hereinafter explained in more detail. The arcuate pallet guide track sections 25 and 26 of FIG. 3 were developed for the square pallets shown and it will be noted that the outer arc 26 is provided with a small radius of curvature in order to avoid pallet corner impact.

With reference to FIGS. 4 and 5, chain track octagonal corner section 22, as mentioned above, is preferably constructed as a U-section casting or forging having upward extending chain support rails 28, connecting base 29 and holes 30 cast with hex recesses for assembly bolts.

Figure 6:
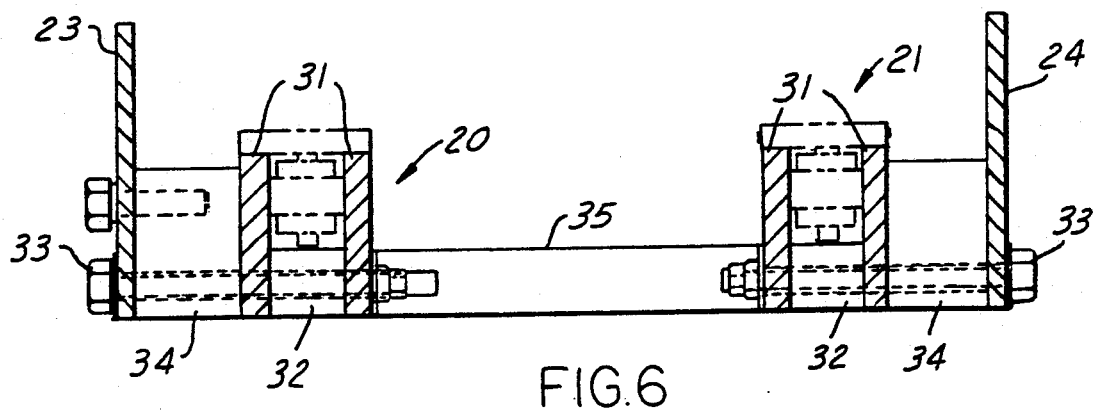
FIG. 6 is a typical track cross section taken along the line 6—6 of FIG. 3.

With reference to FIG. 6 illustrating a typical track cross section, inner chain track 20, and outer chain track 21 are identical with chain guide rails 31 separated by spacers 32 assembled to inner side rail 23 and outer side rail 24 by bolts 33 passing through spacers 34 and inner channel spacers 35. Such track assemblies of suitable length are mounted on spaced floor pedestals, not shown, in appropriate conventional manner relative to required station height.

Figure 7:
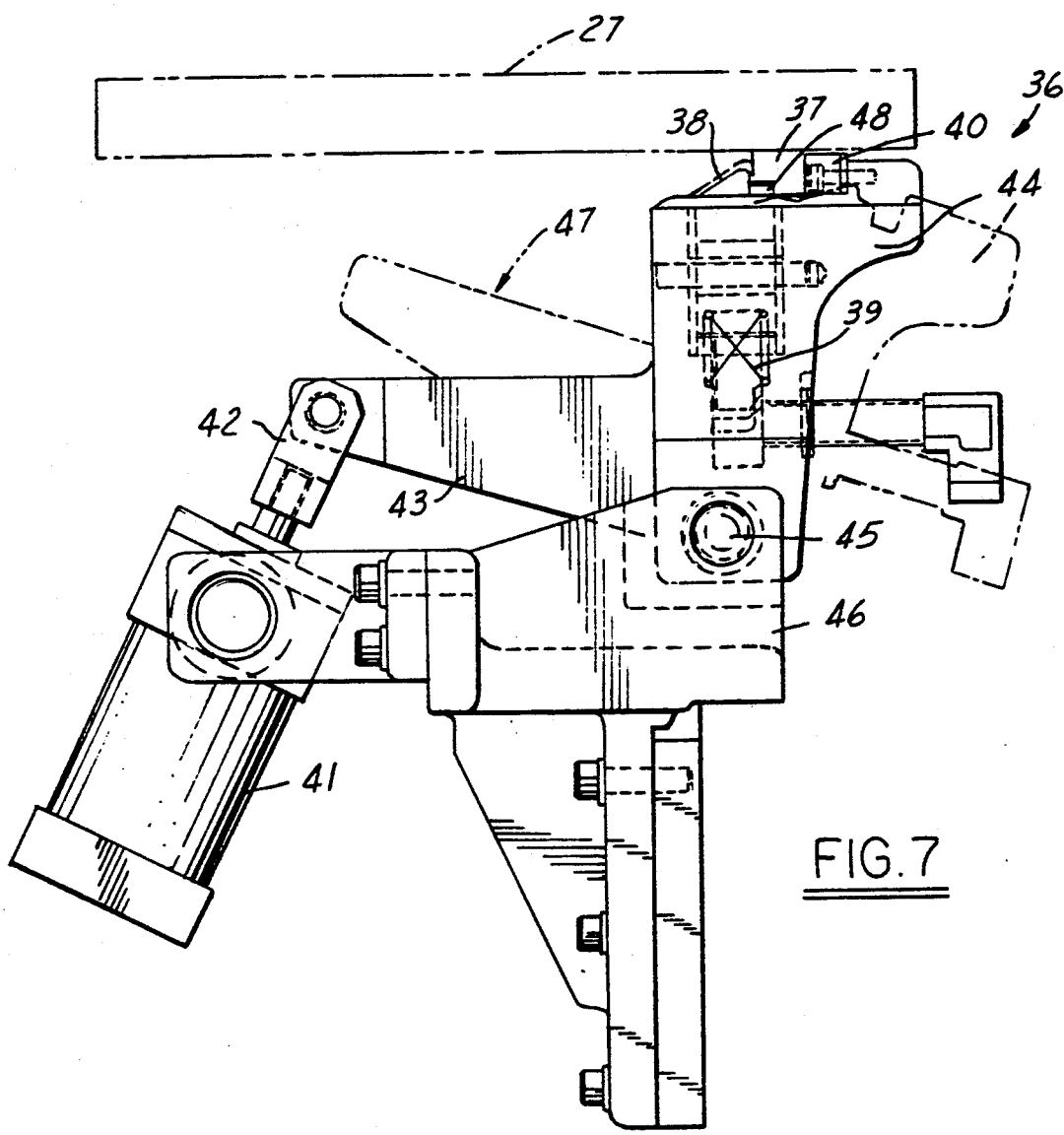
FIG. 7 is a side elevation of a pre-station escapement.

With reference to FIG. 7, pre-station escapement stop 36 is illustrated for a typical pallet such as shown in phantom at 27. Depending pallet dog 37 moving to the right, as illustrated, depresses anti-backup 38 against return spring 39 to engage stop block 40 whenever the adjacent station is occupied by a preceeding pallet. Shoulder 48 on anti-backup 38 senses the presence of pallet 27 by engagement with pallet dog 37 thereby preventing complete return of anti-backup 38 to its normal dotted line position for use in proximity sensing controls. Upon the release of such preceeding pallet from the station, cylinder 41 actuates rod 42 and bellcrank arm 43 to rotate stop housing 44 pivotally mounted at 45 to stationary bracket 46 producing release movement of the stop assembly to phantom position 47.

Figure 8:
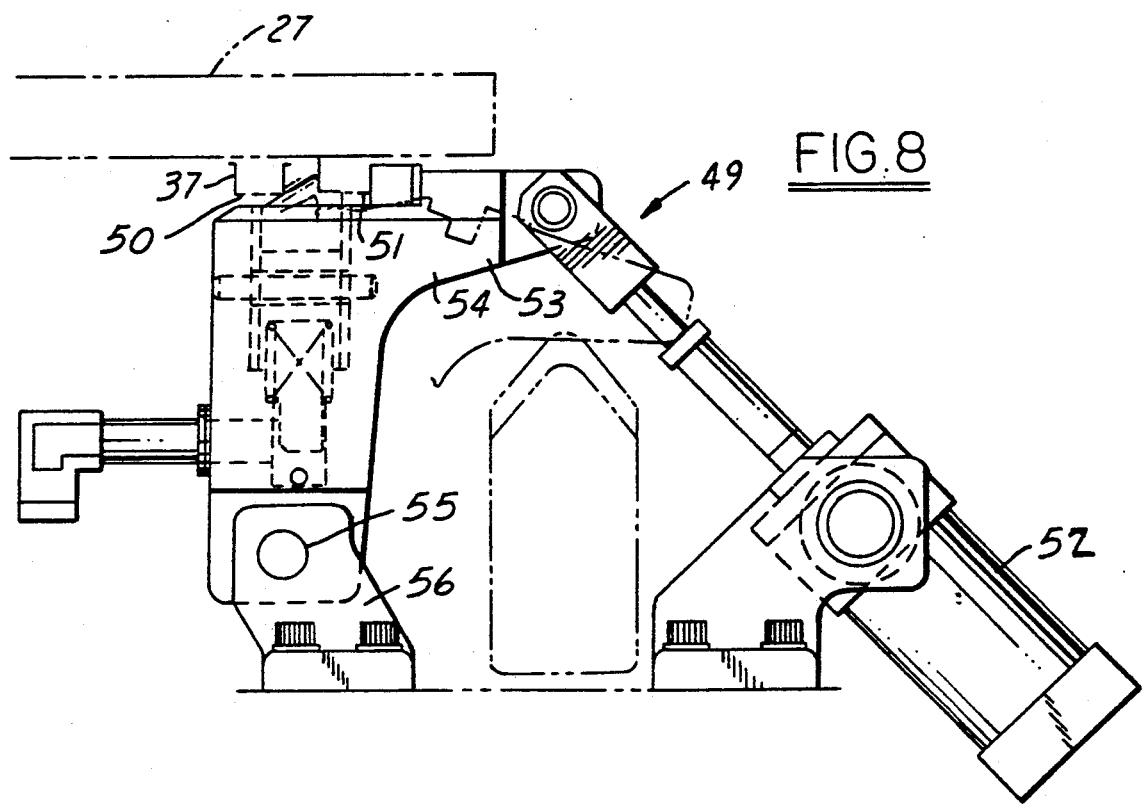
FIG. 8 is a side elevation of an in-station escapement.

With reference to FIG. 8, similar escapement assembly 49 retains pallet 27 in approximate linear position for clamping, as hereinafter described with reference to FIGS. 9-13, with the unclamped level of pallet dog 37 indicated at 50 and the clamped level at 51 reached after depressing the anti-backup ramp against the return spring, as in the stop 36 of FIG. 7. Release cylinder 52, in this case mounted forward of the pallet to provide clearance for station equipment, actuates lever 53 and escapement housing 54 pivotally mounted at 55 to stationary bracket 56 whenever station operation is completed.

Figure 9:
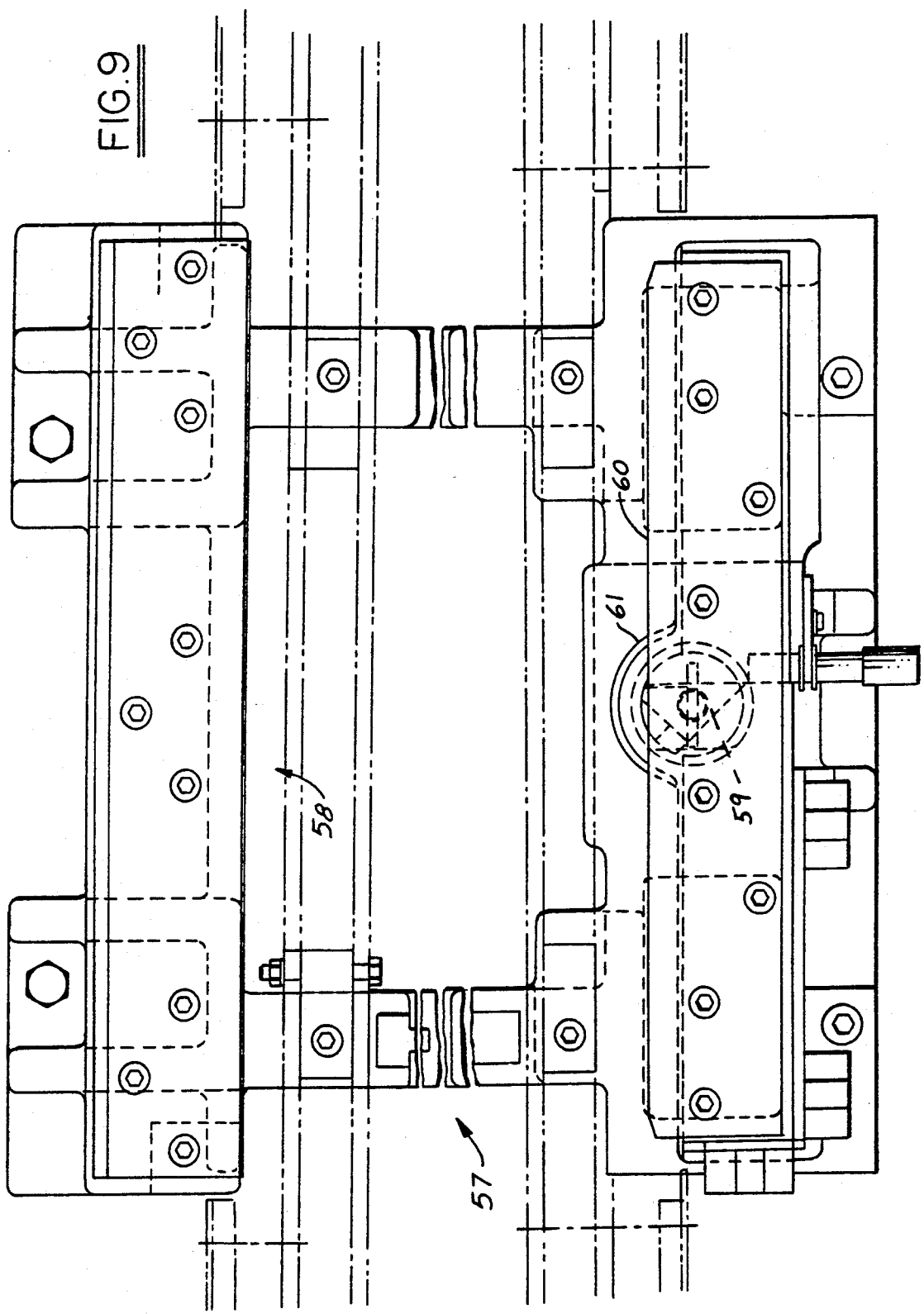
FIG. 9 is a plan view of an automatic register for locating and clamping the pallet.
Figure 10:
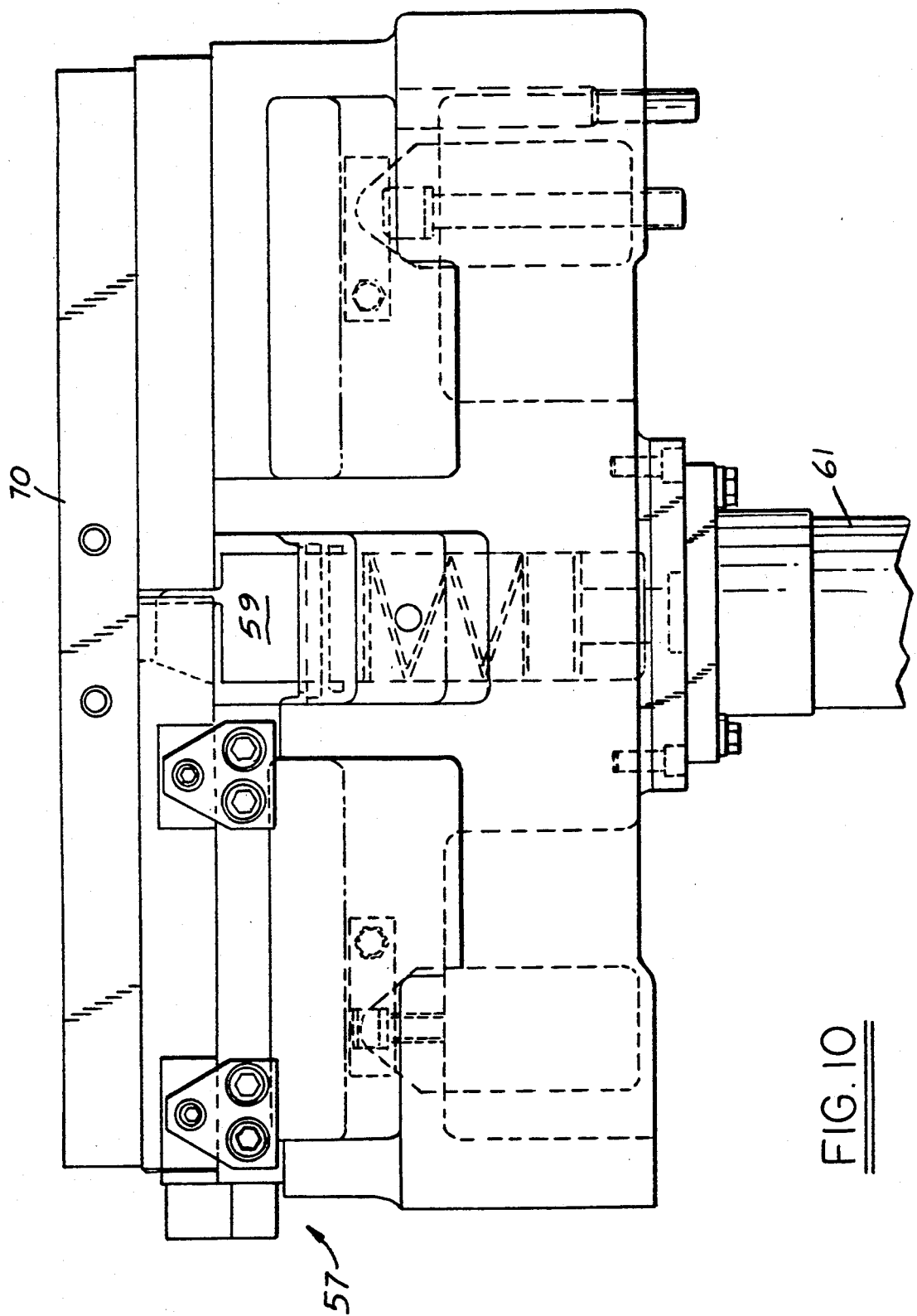
FIG. 10 is a side elevation of the register shown in FIG. 9.
Figure 11:
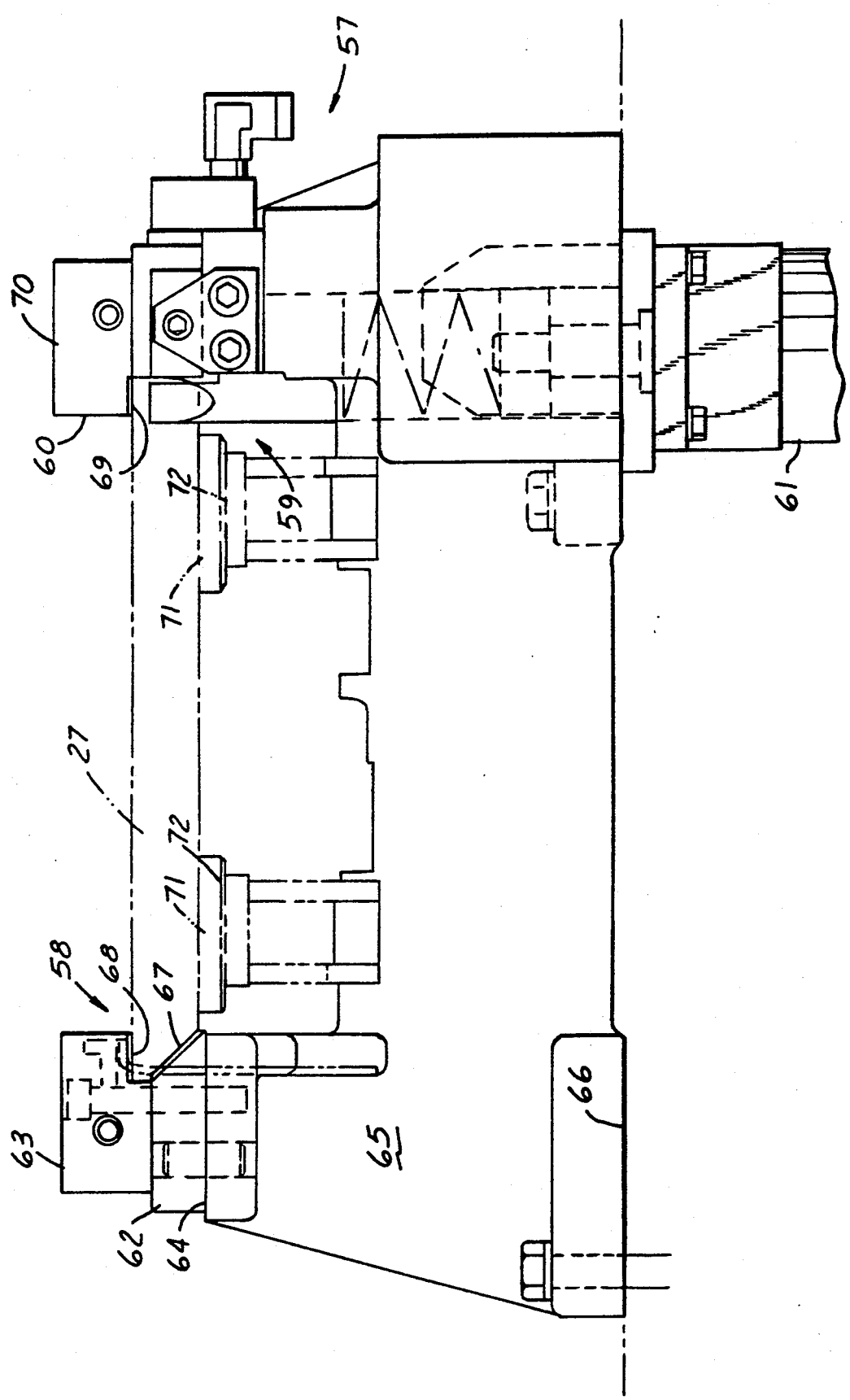
FIG. 11 is a end elevation of the register shown in FIG. 9.

With reference to FIGS. 9, 10 and 11, illustrating a station register and clamp assembly 57, plan view of FIG. 9 shows the relation of side clamp rail assembly 58 with linear locating registering and locking pin 59 together with its associated clamp rail having an inner extremity 60 with the pallet in approximate position established by the station escapement of FIG. 8. Actuation of register pin 59 establishes precise location and clamping with a single stroke produced by cylinder 61.

With reference to FIG. 11, side clamp assembly 58 includes wedge locating rail 62 and fit rail 63 bolted to mounting surface 64 of station housing 65 suitably mounted to the top of base 66. Wedge surface 67 of locating rail 62, serves to raise pallet 27 against locating surface 68 of fit rail 63 upon lateral movement of pallet 27 produced by registration pin 59. Simultaneous clamping of pallet upper surface against registration surface 69 of fit rail 70 completes location and rigid clamping of the pallet, with pallet pads 71 raised from contact with top of chain crescents 72.

Figure 12:
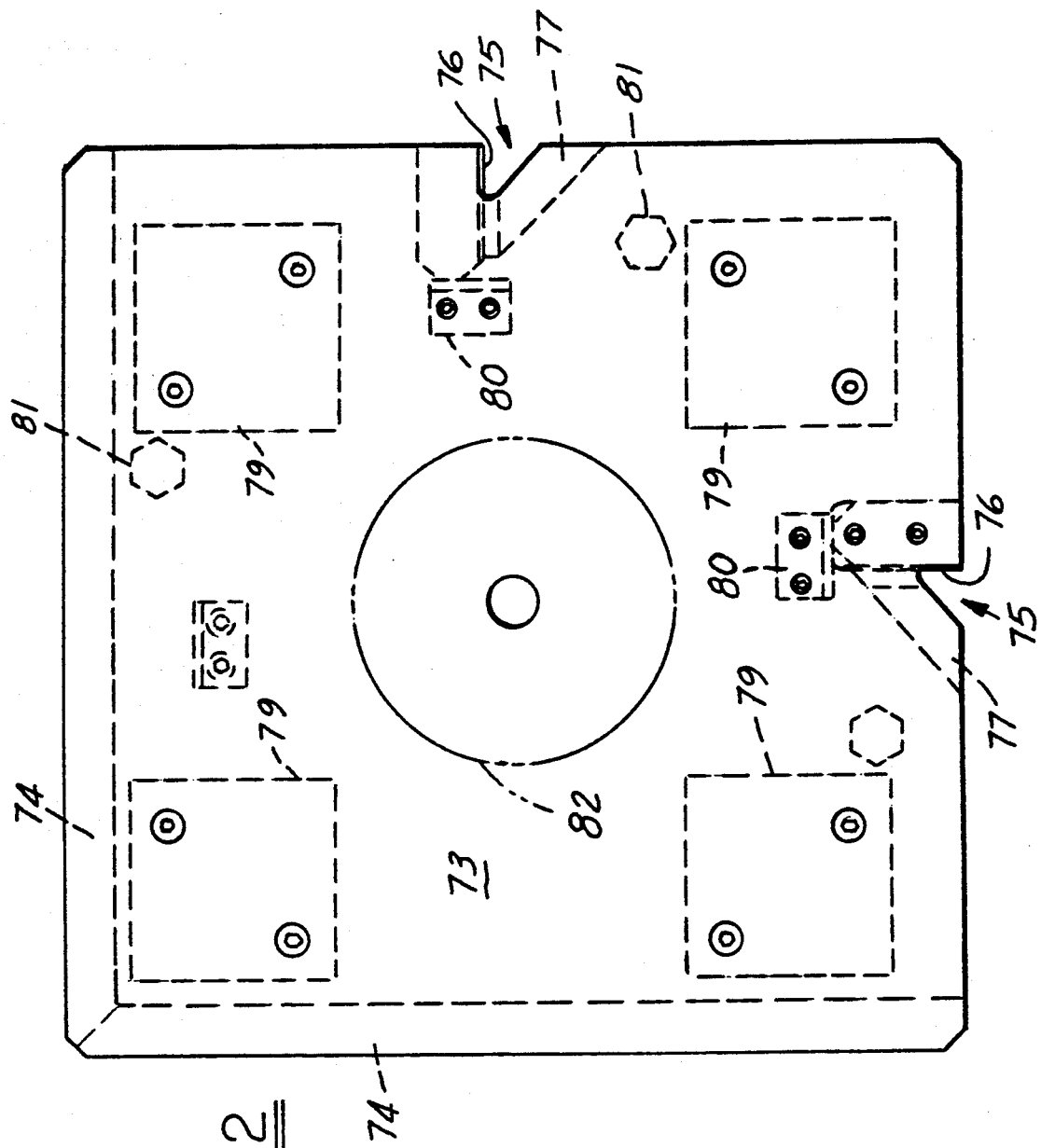
FIG. 12 is a plan view of an indexable square pallet assembly.
Figure 13:
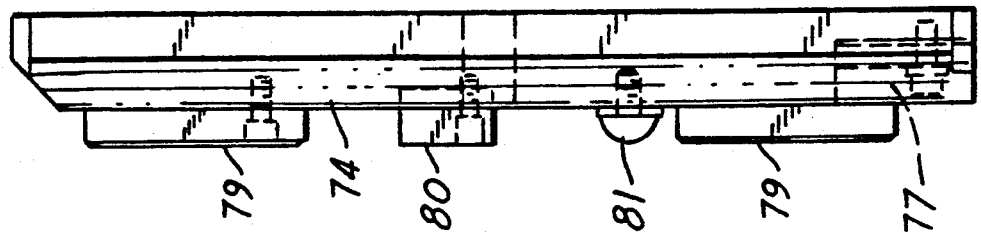
FIG. 13 is an end elevation of the FIG. 12 pallet assembly.

FIGS. 12 and 13 illustrate a typical indexable square pallet assembly comprising pallet plate 73 having two sides bevelled at 74 to engage wedge rail 62 of the FIG. 9-11 register and the other two sides provided with locater notches 75 fitted with locater 76 for accurately establishing the longitudinal station clamping position relative to a transverse surface at the top of register pin 59 shown in full line in FIG. 10 and angular bevelled surfaces 77 for engagement by a matching beveled surface of register pin 59 for producing simultaneous lateral and backward movement of the pallet against said transverse surface with clamping engagement of registration surfaces 74 and 76 as well as upward movement to clamp the pallet top against fit rails 63 and 70. Four pads 79 and two actuators 81 used in sensing pallet position for chain engagement, are bolted to the underside of the pallet as well as two stop keys 80. A pallet rotating unit mounting area 82 is provided at the center of the pallet.

With reference to FIG. 15-17, conventional roller chain upper side links 83 are connected by pivot pins 84 to lower side links 85, with rollers 86 rotatable therebetween on bushings 87. Chain crescent plates 88 having recessed apertures 89 for heads of pivot pins 87 ride on chain support rails 31.

We claim:

1. A closed horizontal path nonsynchronous manufacturing system for performing successive accurately interrelated manufacturing operations at successive stations on production quantities of like work pieces comprising a plurality exceeding five of straight obtuse angle related pallet path work station segments connected by minimal transition polygonal path corners, pallet guide track means extending along said path including means for positively controlling and diverting pallet direction at said corners to rotate the pallet through the corner angle and thereby maintain continuing pallet orientation relative to said path around said corners, said last means comprising an outer guide track engaged by the outer lead corner of a pallet in effecting change of direction at said corners and an inner guide track engaged by an inner trailing side edge of a pallet to provide in combination with forward pallet propulsion an effective rotational force couple on the pallet, pallet support and traction transport means for moving pallets in a single file along the straight segments of said path and around said path corners, a plurality of successive work stations located at said straight path segments between said path corners for performing said successive manufacturing operations on successive work pieces, a plurality of uniform size fixturized pallets for transporting individual work pieces progressively to said successive work stations, means for stopping and accurately locating each pallet at like linear locational registering means of successive work stations for performing said succession of accurately interrelated manufacturing operations on each work piece without requirement for accurate interrelation of work station locations.

2. The manufacturing system of claim 1 including continuous conveyor chain pallet transport means.

3. The manufacturing system of claim 1 including laterally spaced dual continuous conveyor chain pallet transport means.

4. The manufacturing system of claim 3 including dual upper crescent plate chain connected surfaces for effecting pallet support and traction transport.

5. The manufacturing system of claim 4 including dual roller chains depending from said crescent plates, and dual pairs of rails for supporting said crescent plates and guiding said roller chains.

6. The manufacturing system of claim 5 including dual arcuate corners for said rails at each corner of said path, said roller chains having tension links narrower in width than the diameter of the rollers, and said arcuate corners having convex rails with radii such as to provide tension link clearance relative to each convex arc of said convex rails in passing around said corner.

7. The manufacturing system of claim 6 wherein both inner and outer convex rails are provided with equal convex arcuate curves.

8. The manufacturing system of claim 6 including parallel linear sided pallets, said outer and inner pallet guide track means, for controlling the angular transition of said pallets in rounding said obtuse angle corners through progressive contact of the lead outer corner of said pallet with said outer guide track and variable inner side contact of said pallet with said inner guide track, including a transverse inner and outer pallet contact non-binding angle throughout said angular transition.

9. The manufacturing system of claim 8 wherein the outer pallet guide track is provided with an arcuate corner to smooth the transition in changing the direction of said pallet.

10. The manufacturing system of claim 9 wherein said inner pallet guide track is configured to closely approximate with clearance the inner margin of the swept area of a pallet in rounding said corner with the outer corners of the pallet engaging said outer guide track.

11. The manufacturing system of claim 10 wherein the minimum transverse angle between the lead contact of the pallet with the outer guide track and the contact point of the inner side of said pallet with said inner guide track is greater than a binding angle at all positions of transition.

12. The manufacturing system of claim 11 including generally rectangular pallets with at least the outer lead corners of the pallet rounded to contribute to a smooth transition engagement with the outer guide track in passing around the corner.

13. The manufacturing system of claim 12 including square indexable pallets.

14. The manufacturing system of claim 1 including a pallet locating registration rail means at each work station providing engagement with one linear side edge of a pallet for locating its lateral position.

15. The manufacturing system of claim 14 including a power actuated registration pin with means for laterally forcing said pallet into accurate registration with said lateral locating rail.

16. The manufacturing system of claim 14 including a power actuated registration pin with means for laterally forcing said pallet into accurate registration with said lateral locating rail and simultaneously accurately establishing the longitudinal position of said pallet relative to said station.

17. The manufacturing system of claim 14 including a power actuated registration pin with means for laterally forcing said pallet into accurate registration with said lateral locating rail, simultaneously accurately establishing the longitudinal position of said pallet relative to said station and simultaneously raising said pallet into an accurate vertical position at said station.

18. The manufacturing system of claim 14 including a power actuated registration pin with means for laterally forcing said pallet into accurate registration with said lateral locating rail, simultaneously accurately establishing the longitudinal position of said pallet relative to said station and simultaneously raising said pallet into an accurate vertical position at said station, said last means including a ramp surface of said rail and a cooperating horizontal registration surface for respectively raising and clamping said linear side edge in said accurate vertical position in response to lateral movement of said pallet.

19. The manufacturing system of claim 18 wherein said last means also includes a horizontal registration surface for clamping the other side edge of said pallet in accurate vertical position in response to actuation of said registration pin.

20. The manufacturing system of claim 10 wherein said clearance at the inner margin of said swept area is increased to move the inner contact point of the pallet backward substantially from the center at the midpoint of pallet transition in passing around said corner.

* * * * *